US008595426B2

(12) United States Patent
Ittah et al.

(10) Patent No.: US 8,595,426 B2
(45) Date of Patent: Nov. 26, 2013

(54) HANDLING COMMANDS WITHIN A WRITE-ONCE READ-MANY STORAGE DEVICE CONFIGURATION

(75) Inventors: Eyal Ittah, Alphe-Menashe (IL); Ehud Cohen, Rehovot (IL); Lola Grin, Netanya (IL); Uri Peltz, Hod Hasharon (IL); Yossi Bener, Shoham (IL); Boaz Greenberg, Petach Tikva (IL); Yonatan Halevi, Petach Tikva (IL)

(73) Assignee: Sandisk IL Ltd., Kfar Saba (IL)

( * ) Notice: Subject to any disclaimer, the term of this patent is extended or adjusted under 35 U.S.C. 154(b) by 252 days.

(21) Appl. No.: 13/084,111

(22) Filed: Apr. 11, 2011

(65) Prior Publication Data

US 2012/0260022 A1  Oct. 11, 2012

(51) Int. Cl.
 *G06F 12/00* (2006.01)
 *G06F 13/00* (2006.01)
 *G06F 13/28* (2006.01)
 *G06F 9/26* (2006.01)
 *G06F 9/34* (2006.01)

(52) U.S. Cl.
 USPC ........... 711/104; 711/103; 711/115; 711/202; 711/102

(58) Field of Classification Search
 USPC .......................... 711/707, 200; 707/813–820
 See application file for complete search history.

(56) References Cited

U.S. PATENT DOCUMENTS

| | | | | |
|---|---|---|---|---|
| 6,523,102 B1 * | 2/2003 | Dye et al. | | 711/170 |
| 6,895,490 B1 * | 5/2005 | Moore et al. | | 711/203 |
| 7,603,533 B1 * | 10/2009 | Tsypliaev et al. | | 711/167 |
| 2003/0065899 A1 * | 4/2003 | Gorobets | | 711/165 |
| 2003/0123287 A1 * | 7/2003 | Gorobets | | 365/185.11 |
| 2003/0165076 A1 * | 9/2003 | Gorobets et al. | | 365/200 |
| 2004/0133544 A1 * | 7/2004 | Kiessig et al. | | 707/1 |
| 2007/0028056 A1 * | 2/2007 | Harris | | 711/150 |
| 2007/0198550 A1 | 8/2007 | Irving et al. | | |
| 2007/0205867 A1 * | 9/2007 | Kennedy et al. | | 340/10.1 |
| 2007/0206400 A1 | 9/2007 | Bress et al. | | |
| 2008/0259751 A1 * | 10/2008 | Nakamura et al. | | 369/47.13 |
| 2008/0307192 A1 * | 12/2008 | Sinclair et al. | | 711/218 |
| 2009/0019245 A1 * | 1/2009 | Bondurant et al. | | 711/161 |
| 2009/0172321 A1 | 7/2009 | Scheuerlein et al. | | |
| 2010/0017558 A1 * | 1/2010 | Fruin et al. | | 711/103 |
| 2010/0017559 A1 | 1/2010 | Fruin et al. | | |
| 2010/0161882 A1 * | 6/2010 | Stern et al. | | 711/103 |
| 2011/0082966 A1 * | 4/2011 | Yu et al. | | 711/103 |

OTHER PUBLICATIONS

Rowlfe, What is the difference between a physical sector and a logcial sector? , Oct. 2007, yahoo.com, <http://answers.yahoo.com/question/index?qid=20080120123858AAd76ei>.*
Russo, Guido et al. "An Operating System Independent WORM Archival System," Software—Practice and Experience, May 1995, vol. 25(5), pp. 521-531.

* cited by examiner

*Primary Examiner* — Yaima Rigol
(74) *Attorney, Agent, or Firm* — Toler Law Group, PC

(57) ABSTRACT

In a particular embodiment, a storage device with a memory, a controller, and a host interface has a write-once read-many device configuration. The memory contains a database having entries, each entry for a logical memory address. The memory further contains information for converting each logical memory address to a redirected logical memory address that corresponds to a physical memory location. The controller receives a command specifying a logical memory address and interprets the command based on information extracted from the database. The controller executes the command according to the information.

16 Claims, 5 Drawing Sheets

| 114 | Redirected LA | Directory | Deleted |
|---|---|---|---|
| LA0 | RLA0 | 1 | 0 |
| LA1 | -1 | -1 | 1 |
| LA2 | -1 | -1 | 1 |
| LA3 | -1 | -1 | 1 |
| ... | | | |

| 112 | Redirected LA | FS info |
|---|---|---|
| | | |

Fig. 2A

| 114 | Redirected LA | Directory | Deleted |
|---|---|---|---|
| LA0 | RLA0 | 1 | 0 |
| LA1 | (RLA1) RLA4 | (-1) 0 | (1) 0 |
| LA2 | (RLA2) -1 | -1 | 1 |
| LA3 | RLA3 | 0 | 0 |
| ... | | | |

| 112 | Redirected LA | FS info |
|---|---|---|
| LA1 | RLA1 | "xxx" ... |
| LA2 | RLA2 | "yyy" ... |

Fig. 2B

HANDLING COMMANDS WITHIN A WRITE-ONCE READ-MANY STORAGE DEVICE CONFIGURATION

BACKGROUND

Write-once read-many storage devices, often called WORM devices, are a type of a mass storage device configuration typically designed for large-scale and long-term data storage and retrieval. WORM devices are non rewriteable. This means that data, once written, cannot be later changed, erased, or overwritten. Moreover, WORM devices are characterized by the long lifetime of the written data, without any human intervention for data refreshing, or for any particular environmental conditions.

In order to enforce the write-once, read-only feature and ensure that once data is written to a WORM device it could never be deleted by the host there may be a need to configure the relevant host device to support additional, product specific command sets. Parsing extended commands by the host device may require using or operating WORM devices with compatible host devices only, which may, in turn, limit the use opportunities for such WORM devices.

Hence there is a need to provide a more autonomous operation of such WORM devices.

SUMMARY

Embodiments of the present invention are defined by the claims, and nothing in this section should be taken as a limitation on those claims. As a brief introduction, embodiments described in this document and illustrated in the attached drawings generally relate to a storage device having a write-once, read-many device configuration that includes a host interface, a memory, and a controller, where the controller is configured to execute commands received via the host interface according to internal information that is extracted from a database transparently to the host device.

Various embodiments described herein represent such storage devices arranged as WORM devices to ensure that once data is written to the storage device it cannot be deleted again by a host device. For example, a storage device having a write-once, read-many device configuration comprises a host interface, a controller and a memory storing a database with entries for logical memory addresses. In one implementation, the database stores all possible logical memory addresses in the memory, such that each entry in the database includes information for converting its respective logical memory address to a redirected logical memory address. In the context of this disclosure, a redirected logical memory address of a logical memory address represents a logical memory location corresponding to the physical memory location where data associated with the logical memory address actually resides. Locally in the storage device and transparently to the host, a logical memory address received from the host is translated to another logical address, the so-called redirected logical memory address, which is actually the one corresponding to the physical storage address to be accessed. The controller is configured to, when the host interface is operatively coupled to a host device, receive a command that specifies a logical memory address and interpret and, transparently to the host, to re-direct the command based on information extracted from an entry in the database for the specified logical memory address. The controller then executes the command according to the information, transparently to the host device. This way, the storage device can operate as a WORM device compatible with various types of host devices. The transparent interpretation and execution of commands, as preformed by the controller of the storage device of this disclosure, are applicable to various command types.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and together with the description serve to explain its principles. Wherever convenient, the same reference numbers will be used throughout the drawings to refer to the same or like elements.

FIG. 2A illustrates a memory organization in the storage device;

FIG. 2B illustrates another memory organization in the storage device;

DETAILED DESCRIPTION

Figure 1:
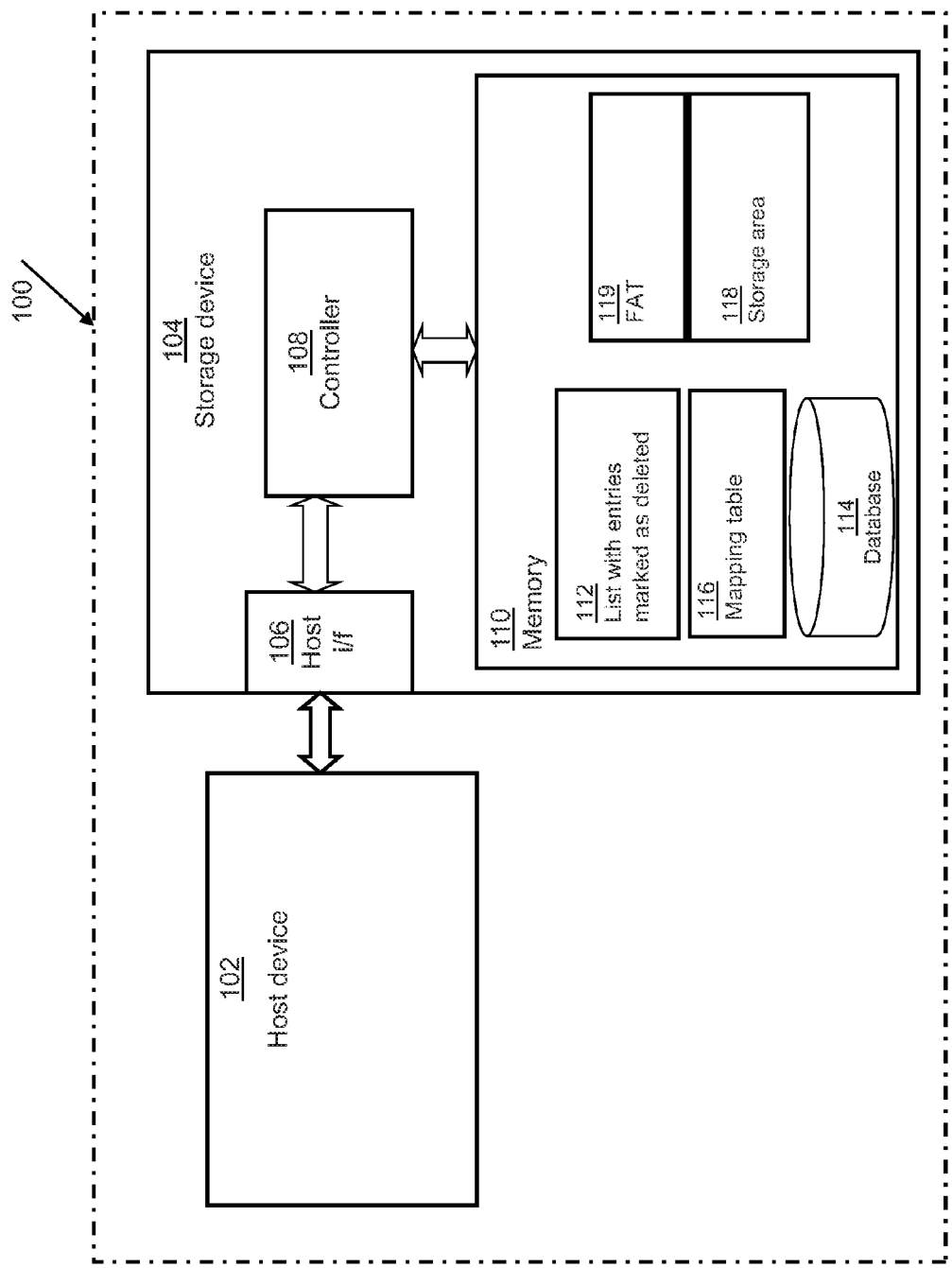
FIG. 1 illustrates one system with a storage device in which the invention is embodied.

Various modifications to and equivalents of the embodiments described and shown are possible and various generic principles defined herein may be applied to these and other embodiments. Thus, the claimed invention is to be accorded the widest scope consistent with the principles, features and teachings disclosed herein.

The disclosed embodiments described here are based, in part, on the observation that current WORM storage devices are limited and may be able to operate only with WORM-enabled hosts that ensure that once data is written to the storage device it could never be deleted by a host. Hence, to enable the use of WORM devices with any host device there is a need to find a way for enforcing the write-once, read-only feature directly on the storage device, in a way that is transparent to the host device.

According to an embodiment, a storage device is configured as a WORM device with a host interface, a controller and a memory. The memory contains a database with entries for logical memory addresses. Each entry in the database holds information for converting its respective logical memory address to a redirected logical memory address. When the host interface is connected to a host device, the controller receives a command (such as a read or write command) from the host device via the host interface. The command typically specifies a logical memory address for writing the data to or for reading the data from the memory. The controller interprets and executes the command on the storage device according to information in the database, transparently to the host device. Configuring the controller to handle (i.e. interpret and execute) commands on the storage device as such, makes it possible to enforce the write-once read-many feature for all types of commands autonomously on the storage device, i.e. in a way that is transparent to the host device. This storage device configuration shifts the burden of enforcing the write-once, read-many feature of operating the storage device as a WORM device from the host device to the storage device (to the storage device controller) and allows for a WORM device to operate with any type of host device, hence avoiding the previously-requisite host device customization.

A mass storage device is commonly a storage device with a nonvolatile memory. A storage device with a nonvolatile memory retains its stored content or stored state even after power is removed. As suggested above, when configured as a write-once, read-only (WORM) device such storage device is designed to operate with any host device and ensure that once data is written to the storage device it cannot be deleted again by a host device. The storage device may have a configuration that complies with any memory (e.g. flash memory), Trusted Flash device, Secure Digital ("SD"), mini SD, micro SD, Hard Drive ("HD"), Extreme Digital ("xD"), or Multi Media Card ("MMC") specification. The storage device of this disclosure is also applicable with any memory card format, such as a Secured Digital ("SD") memory card format used for storing digital media such as audio, video, or picture files. The storage device may also have a configuration that complies with a High Speed Multi Media Card ("HS-MMC") memory card format, a compact Flash ("CF") memory card format, a flash PC (e.g., "ATA Flash") memory card format, a Smart-Media memory card format, or with any other industry standard specifications. One supplier of these memory cards is SanDisk Corporation.

The storage device may also have a configuration complying with a high capacity subscriber identity module ("SIM"), also referred to as "HCS", memory card format. The high capacity SIM memory card format is a secure, cost-effective and high-capacity storage solution for the increased requirements of multimedia handset. A HCS card is typically configured to use a host's network capabilities and/or other resources, to thereby enable network communication.

Note that the storage device configuration does not depend on the type of removable memory. Accordingly, the teachings described herein can be applied to any type of memory, whether it is a multiple-type-programmable, few-time-programmable ("FTP"), or any other type of read-write memory, and can be built using standard two-dimensional flash memory or three-dimensional flash memory, or the like.

In general, the storage device of this disclosure is commonly a memory card that is used in any host device, such as digital cameras or mobile phones, and may be designed to provide on-line and archival services of long term storage of digital still images, video images, audio recording, and the like. One example includes storing of digital still images, video images, and audio recording that may be used as evidence for police departments and other organizational applications where data reliability and security are paramount. Another example includes providing archival usages of long term storage of photos, video, financial records, and the like for retail sale, including but not limited to consumer electronic stores, on-line services, point of sale receipts for tax collection purposes, among others. The storage device of this disclosure is, thus, designed for these and other applications of a WORM device.

Host systems that use such storage devices may be substantially any system or device which sends and retrieves data or information to and from the storage device, including personal computers (PCs), notebook computers and various mobile and handset devices such as hand held computing devices, digital cameras, video cameras, cellular communication devices, audio and video reproducing devices, digital music players such as MP3 players, global positioning devices, and other electronic devices requiring removable data storage. Flash EEPROM systems are also utilized as bulk mass storage embedded in host systems. The storage device may be connected to or plugged into a compatible socket of a PDA (Personal Digital Assistant), mobile handset, and other various electronic devices.

FIG. 1 illustrates one system 100 with a storage device configured according to one embodiment. System 100 includes a host device 102 and a storage device 104 that is operatively coupled to host device 102 via a host interface 106. Host interface 106 may facilitate wired or wireless communication between storage device 104 and host device 102 and may include one or more ports, conforming to one or more configuration types, including a Secure Digital ("SD") port specification, an Advanced Security Secure Digital ("ASSD") port specification, or to an embedded Multi-Media Content ("eMMC") port specification, among others. In one application, storage device 104 may be "embedded", namely an embedded memory device installed within host device 102. This means that that the storage device cannot, and is not intended to customarily be removed by a user from a host device (e.g. host device 102) with which it operates. Alternatively, storage device 104 may be removable, which means that the user can move it from one host device to another, or replace the storage device with another. Storage device 104 is configured as a WORM device with a memory 110 and a controller 108 so that once data is written to the storage device it could never be deleted by a host. In a typical implementation, the storage device is a designed as a Secure Digital (SD) card for mounting with a host device, where the host device is operable as a digital camera. Connecting arrowed-lines illustrate the physical connections between the operational blocks within storage device 104.

Memory 110, typically based on a non-volatile flash-based memory technology, includes a storage area 118 for storing data, say, in the form of files. Memory 110 is typically formatted with a file allocation table (FAT) 119 file system architecture, so that access to files on storage area 118 is done via the FAT 119. In general, a file allocation table, such as FAT 32, is a computer file system architecture that is created for and used on many computer systems and memory cards. When used on a memory card or any other portable storage device, the file allocation table is managed by a host to which the memory card is coupled to. In other words, a file allocation table being configured on a storage device is accessible to and further manageable by a host to which the storage device is coupled. The file system may be used by a host to indicate used and available clusters on the storage device. Identifying available clusters could be used by the storage device in order to find available memory locations. In computer file systems, a cluster is the unit of storage space allocation for files and directories built up of one or more sectors. Thus, for example, a file may be represented by one or more of these clusters and may be fragmented throughout the memory. Each entry in the FAT 119 may contain information, such as the file name, file size, file start cluster, and associated attributes, which relate to the way a directory and associated files are stored in the memory 110.

Memory 110 is further formatted to contain a database 114 having logical memory address entries that are accessible only internally by controller 108. In one implementation, database 114 contains all possible logical memory addresses in the memory 110. The logical memory address entries in database 114 represent logical memory addresses that are specified in commands received from the host device 102, and thus are referred to herein as 'specified logical memory addresses'. A logical memory address entry in database 114 may represent various types of data structures, including but not limited to a block of memory cells, a memory unit, a particular sector, or a page. In one embodiment, with FAT 119 holding directory entries for clusters in the memory 110, a logical memory address entry in database 114 represents a cluster (a small block of contiguous space) in the FAT 119. In such case, i.e. with FAT 119 handling the memory space in clusters, each cluster in the memory 110 is represented by a corresponding entry in the database 114.

Each entry in database 114 contains information for converting its logical memory address (specified logical memory address) to a redirected logical memory address. The information may include storage information, availability information, status information, and any other information required for converting the logical memory address to a redirected logical memory address. In a particular implementation, database 114 may include in each entry for a logical memory address a redirected memory address that corresponds to the logical memory address, an indication of the type of data associated with the logical memory address (e.g., whether the data relates to a file or a directory), and an indication on whether the logical memory address is marked as deleted.

As mentioned above, locally in the storage device and transparently to the host, a logical memory address received from the host is translated to another logical address, the so-called redirected logical memory address, which is actually the one corresponding to the physical storage address to be accessed. To the storage device 104 (i.e. to the controller 108) the re-directed logical address and, in turn, the physical memory address represents a memory location where data associated with the logical memory address actually resides. This means that redirected logical memory addresses of a specified logical memory address are utilized internally by the storage device (i.e. by the controller 108) as a local reference for performing internal (e.g. storage) operations on the storage device 104.

Conventionally, physical memory addresses are used internally (by controller 108) to perform storage operations directly on physical memory locations in the memory and logical memory addresses are usually used by external devices (e.g., host device 102) as a higher level of reference to the physical memory locations. In the context of this disclosure, specified logical memory addresses are used in external communication with host device 102; while redirected logical memory addresses and physical memory addresses are used locally by the controller 108 to perform internal operations on the storage device 104. That is, host device 102 stores data in and obtains data from storage device 104 by using specified logical memory addresses. Storage device 104, on the other hand, interacts with internal components on the storage device 104 by using redirected logical memory addresses and then accesses the memory 110 (e.g. for storing or reading the data) by using physical memory addresses that correspond to the redirected logical memory addresses.

Accordingly, memory 110 includes a mapping table 116 for translating or mapping logical memory addresses (in this case redirected logical memory addresses) to corresponding physical memory locations where data is actually physically stored. A physical memory location is the location of a block of memory cells or a group of contiguous blocks (e.g. cluster) that is addressable by using a unique physical memory address. Mapping table 116 holds entries for the re-directed logical memory addresses. Each entry includes an association between a redirected logical memory address and a physical memory address. Thus, for example, redirected logical memory address "RLA0" (not shown in FIG. 1) may reference a physical memory address "PA100"; redirected logical memory address "RLA1" may reference a physical memory address "PA101", and so on. Note that the mapping table 116 and the database 114 are described to and further shown in FIG. 1 as implemented as separate data structures. However, in an alternative implementation the mapping table 116 and the database 114 can be part of the same data structure—that is in the same table or database, for example created and maintained in two different columns, etc. One example of a suitable implementation of mapping table 116 is described with regard to U.S. Pat. No. 5,404,485 entitled "Flash File System", which is incorporated here by reference in its entirety.

Controller 108 is configured to interact with memory 110 and to manage data storage and transfer in and out of memory 110 directly. Controller 108 is also configured to execute storage commands, such as read, write and erase commands, and to perform other operations, including application invocation, control functions for power management, storage device status, and configuration queries and other mass storage operations that require access to memory 110.

In general, controller 108 is configured to, when host interface 106 is operatively coupled to host device 102, to receive a command from the host device 102 via host interface 106. The received command, being a storage command such as for reading or writing of data, specifies a logical memory address in storage area 118 for which data is to be read from or written to. Controller 108 interprets the command based on information extracted from an entry in the database 114 that corresponds to the specified logical memory address, and then executes the command according to the information, transparently to the host device 102.

More specifically, with controller 108 communicating with host device 102 and receiving a command that specifies a logical memory address, controller 108 interprets the command so that it represents a an internal reference, as used by the controller 108 for performing internal operations on the storage device 104. Controller 108 does this by accessing the entry in database 114 that corresponds to the specified logical memory address and extracting a redirected logical memory address that represents the memory location in storage area 118 where data associated with the specified logical memory address actually resides, or is to be written to. (Database 114 typically holds entries for all possible logical memory addresses in the memory 110.) Controller 108 may further utilize the information kept in the entry in the database 114 to determine the type of data (e.g. directory or a file) and/or status (e.g. occupied or marked as deleted) of the data that is associated with the logical memory address entry. In an example, controller 108 may be configured to handle a command associated with a directory cluster in one way and to handle the same command in a different way when associated with a file cluster. For example, controller 108 may allow multiple write operations to a directory but only a single write operation to a file. Accordingly, one or more parameters, in addition to the redirected logical memory address, may be factored in by the controller 108 when interpreting and executing the commands on the storage device 104.

Returning to FIG. 1, controller 108 interprets a command that is received from the host device 102 by utilizing the redirected logical memory address that corresponds to the specified logical memory address in database 114. If a redirected logical memory address is not yet stored in this entry in the database 114, then controller 108 may create such association by identifying an available memory location in storage area 118. The logical memory address that is associated with this available memory location is then stored in the entry in the database 114 as the redirected logical memory address.

In one embodiment, controller 108 creates such association by identifying the next available memory location. In such case, the redirected logical memory address is associated with the next next available memory location in the memory 110 (i.e. in storage area 118). This may be applicable in a memory constellation where data is being written to storage area 118 and further managed by the controller 108 in a sequential manner, e.g. in sequential clusters, with logical memory address "LA0" representing the memory location where the root directory is stored for example. In a typical implementation, controller 108 identifies the next available memory location by maintaining a counter that is incremented by one every time new data is being written to an unoccupied logical memory address in the memory 110. The counter, representing the redirected logical memory address (i.e. the next available memory location), may be initialized to zero so that the redirected logical memory address associated with the root directory is redirected logical memory address "RLA0". Such memory constellation spares the need for tracking the memory locations (e.g. sectors) being written, or for understanding the directory structure being used by the operating system of the host device in order to identify the next available memory location in the memory 110.

Although the examples provided herein focus on the controller searching for an available memory location by identifying the next available memory location in the memory, it is contemplated that controller 108 may search for an available location in the memory in any other way that is known in the art or yet to be discovered.

Controller 108 utilizes the redirected logical memory when interoperating with mapping table 116 in search for a corresponding physical memory address. The identified physical memory address represents the actual memory location for reading from or writing the data to. Controller 108 then executes the command, for example by reading from or writing to this physical memory address in the storage area 118, and notifies the host device 102 that the operation is successfully performed.

Controller 108 interprets and executes commands that are received from the host device 102 in a way that is transparent to the host device 102. This typically means that controller 108 maintains and updates database 114 with internal information that is not accessible to an external device. Moreover, controller 108 interprets and executes commands that are received from the host device 102 by utilizing internal information stored in the memory 110, so that no modification on the host device 102 is required.

The transparent command interpretation and execution applied by the controller 108 may also affect the way the controller 108 communicates with the host device 102. For example, controller 108 may notify the host device 102 that a command is successfully performed, i.e. data is successfully written to (or read from) a specified logical memory address, when in effect the data is written to (or read from) a redirected logical memory address that corresponds to the specified logical memory address. This also means that controller 108 may notify the host device 102 that a command to deleted data from the memory 110 is successfully performed, i.e. the data is successfully deleted from the specified logical memory address, when in effect the data still resides in the memory 110.

As mentioned above, the transparent command interpretation and execution is applicable to various types of commands. Thus, for example, if the command received from the host device 102 is a command to read data from a specified logical memory address, controller 108 reads the data from the physical memory address in the memory 110 and then transfers the read data to the host device 102 via host interface 106. In a similar manner, if the command is a command to write new data to a specified logical memory address, controller 108 writes the data to the physical memory location that corresponds to the redirected logical memory address (physical memory address) and notifies the host device 102 that the write operation is successfully performed. Once the controller 108 has written data to a physical memory location (e.g. sector) in the storage device, it is logged in database 114. Should there be an attempt to write to this sector a second time, the controller 108 will either return status indicating that the command has failed (in case of a file sector), or write the data to an available memory location in association with this sector (in case of a directory sector). The way in which controller 108 handles a command to write new data to the memory 110 will be described in more detail below, in conjunction with FIG. 4.

According to another example, a command received from the host device 102 is a command to write data to a specified a logical memory address in the memory 110. A write command issued by the host device 102 to the storage device 104 may be a command prompting the storage device 104 (the controller 108) to write new data to the memory 110 or, alternatively, to delete data from the memory 110. Controller 108 may be operative to determine whether the host device 102 is instructing to write new data to the memory 110 or, alternatively, to delete data from the memory 110 by accessing the directory entry in FAT 119 that corresponds to the specified logical memory address and comparing between the data stored in this entry and the data that is received from the host device 102 (via the write command). If the data received from the host device 102 includes new data, such as a new directory entry, in addition to the data already stored in the memory then the command is interpreted by the controller 108 as a command to write new data to the storage device 104. However, in case the data received from the host device 102 does not include a particular directory or file, or alternatively in case the data is marked with a predefined pattern then the controller 108 may interpret the received command as a command to delete the particular directory or file from the memory 110.

According to one embodiment, once controller 108 interprets a write command as a command to delete data from the storage device 104 it operates to handle the command directly on the storage device 104 without actually deleting the data from storage area 118. To achieve this, controller 108 accesses the entry in the database 114 that is associated with the specified memory address and marks this entry (and all associated entries) as deleted. As a result, the memory location associated with the marked entry is presented to the host device 102 as free.

In one implementation, the marked entry is logged in the memory 110 in a list 112. Controller 108 adds the marked entry to the list 112 along with the redirected logical memory address and associated information that relate to the way the directory cluster and associated file clusters are kept on the FAT 119 of memory 110.

In general, list 112 is formatted in the memory to hold entries for logical memory addresses that are marked as deleted in database 114. Controller 108 utilizes and maintains (creates and updates) the list 112 for restoration of data from the memory 110. That is, controller 108 utilizes list 112 in communication with host device 102, so that data in memory locations that are presented to the host device 102 as deleted may be accessed nevertheless by the host device 102, for example at a later point of time. For this purpose, each entry in list 112 contains information for restoring data from its (deleted) logical memory address. The information includes a redirected logical memory address that corresponds to the logical memory address and associated information, such as the file name, file size, file start cluster, and associated attributes, that relate to the way the data is kept in the memory 110 (on FAT 119).

Restoration of data from the memory 110 may be achieved by controller 108, for example, in response to a special command that is issued by the host device 102 to the storage device 104. The command triggers the controller 108 to restore data from a specified logical memory address in the memory 110. In one implementation, this is achieved by the controller 108 accessing the entry in list 112 that is referenced by the specified logical memory address and by utilizing the data (i.e. redirected logical memory address and associated file system information) stored therein. The retrieved information (retrieved from the corresponding entry in list 112) is then stored in (new) entries in database 114 and FAT 119, making it accessible to the host device 102. The way controller 108 creates new entries in database 114 and FAT 119, such that each new entry contains the retrieved information, will be described below in conjunction with FIG. 2A and FIG. 2B.

Note that at no point of time data is physically deleted from the memory 110. Still, controller 108 notifies the host device 102 that the operation is successfully performed. As can be, the way in which controller 108 operates to notify host device 102 as described above may depend on the specific implementation logic of controller 108 and, optionally, on the various applications running on controller 108. In one implementation, controller 108 may issue an indication to host device 102 only after it finishes updating all the information in database 114 and (optionally) in list 112. In another implementation, the indication may be issued after a portion of the information is already updated in database 114, and so on. One way in which controller 108 handles a command instructing to delete data from its memory will be described in more detail below, in conjunction with FIG. 5.

The above-disclosed storage device configuration insures that the once data is written to memory 110 it could never be deleted again by host device 102 or by any other host device. This makes storage device 104 compatible to all current and future host types, regardless of changes in the underlying embodiments. Thus, by configuring the storage device 104 to interpret and execute storage commands directly on the storage device 104, it is possible to operate the storage device 104 as a WORM device and to use the device with any host device.

Functions associated with controller 108 are typically implemented, but need not necessarily, either in software, firmware or hardware, either in a single or as separate functional blocks, as shown in FIG. 1.

FIG. 2A illustrates a physical memory organization in the storage device. FIG. 2A will be described in association with FIG. 1, where information associated with the logical memory address entries in database 114 and list 112 is stored.

Database 114 holds a plurality of entries that are referenced, for example, by logical memory address "LA0", logical memory address "LA1", logical memory address "LA2", logical memory address "LA3", and so on. Each entry in database 114 contains information for converting its logical memory address to a redirected logical memory address where data associated with the logical memory address actually resides. As shown in FIG. 2, each entry in database 114 contains a redirected logical memory address and an indication on whether the data associated with the logical memory address is a directory cluster. The information stored for each logical memory address entry in the database 114 may also demonstrate whether the logical memory address is occupied or free. Demonstrating whether a logical memory address is occupied or free may be achieved by referencing a predefined value, for example the value '−1', in the Directory field of the entry in the database 114. Alternatively, this may be achieved by formatting the database 114 in the memory 110 to include a dedicated field (e.g. a Deleted field) for each entry in the database 114. The dedicated field may indicate whether the corresponding logical memory address is free or occupied.

By way of example, logical memory address "LA0" is associated a redirected logical memory address "RLA0", logical memory address "LA1" is associated a redirected logical memory address "RLA1", logical memory address "LA2" is associated a redirected logical memory address "RLA2", logical memory address "LA3" is associated a redirected logical memory address "RLA3", and so on. Logical memory address "LA0" is associated with a directory (in this case the Root Directory) and logical memory addresses "LA1", "LA2" and "LA3" are each associated with a file. At this point, list 112 does not hold logical memory address entries that are marked as deleted. Accordingly, database 114 does not hold any entry that is marked as deleted.

FIG. 2B illustrates another physical memory organization in the storage device. FIG. 2B will be described in association with FIG. 2A, where entries in database 114 are marked as deleted, for example after receiving a command from the host device 102 (via a write command) to delete data from the memory 110. Accordingly, the data ("Data1", "Data2", not shown in FIG. 2B) associated with the marked entries are not available to the host device 102. Note, however, that at no point of time are the data ("Data1" and "Data2") physically deleted from the memory 110. In other words, though the data remains to be physically stored in the memory, it is not available to the host device 102. See for example FIG. 3, where partial horizontal lines in entries represented by physical memory addresses "PA101" and "PA102" illustrate physically stored data that are not available to the host device 102.

Entries referenced by logical memory addresses "LA1" and "LA2" demonstrate entries in database 114 that are marked as deleted. Namely, the entry referenced by logical memory address "LA1" demonstrates an entry in database 114 that holds new data after being marked as deleted. The entry referenced by logical memory address "LA2" demonstrates an entry in database 114 that is marked as deleted and does not hold (is not associated with) new data. This is further demonstrated in list 112, where entries referenced by logical memory addresses "LA1" and "LA2" are added onto the list 112 and logged as marked entries. Each entry in the list 112 contains information for restoring data from its logical memory address (characterized by 'xxx' and 'yyy', respectively).

For this explanation we assume that host device 102 issues a command (a write command) instructing the storage device 104 to delete data that is stored, for example, in logical memory address "LA1". (In this case, the data to be deleted from logical memory address "LA1" is "Data1", not shown in FIG. 2B). Upon receiving the command, controller 108 accesses the entry in the database 114 that corresponds to logical memory address "LA1" and marks this entry as deleted. The value referenced by '1' of the Deleted field in the entry associated with logical memory address "LA1" demonstrates this. (At this point, the Directory field holds the value '−1' to indicate to the host device 102 that this memory location is free.) This way, logical memory address "LA1" is presented to the host device 102 as an available memory location. List 112 is then updated to include the marked entry and associated information that relate to the way the data associated with the marked entry is stored in the memory 110.

As such, the entry in list 112 referenced by logical memory address "LA1" holds in the Redirected logical memory address filed the redirected logical memory address "RLA1", where data associated with the marked entry still resides. Other file system information that relate to the way the data is stored in the memory (on FAT 119) are kept in the File System (FS) info field. This way, from the storage device's standpoint, the data originally associated with logical memory address "LA1" ("Data 1", not shown in FIG. 2B) remains to be stored in the memory 110; namely, in redirected logical memory address "RLA1". However, from the host device's standpoint, the host request to delete the data is successfully performed because the Deleted field of the entry associated with logical memory address "LA1" is referenced by the value '1'.

We assume further that host device 102 sends a command to storage device 104 to write new data ("Data4", not shown in FIG. 2B) in logical memory address "LA1". Upon receiving the command, controller 108 interprets the command based on information extracted from the entry in the database 114 that corresponds to logical memory address "LA1" and executes the command accordingly. More specifically, controller 108 utilizes the redirected logical memory and the values stored in the Deleted field and Directory field of the entry referenced by logical memory address "LA1" for determining whether the corresponding memory location is free for storing new data. With the Deleted field and Directory field at this stage referencing the values '1' and '−1', respectively, it is determined by the controller 108 that this memory location is free for storing the new data. This prompts the controller 108 to associate logical memory address "LA1" a redirected logical memory address to update the database 114 accordingly. In this case, the new redirected logical memory address is associated with the next available memory location; namely, redirected logical memory address "RLA4". Redirected logical memory address "RLA4" is assumed to be free and, thus, selected for being associated with logical memory address "LA1" (and with the data associated with logical memory address "LA1"). With the data ("Data4") being a file cluster, for example, controller 108 may update the Directory field of the entry referenced by logical memory address "LA1" with the value '0'. This way, logical memory address "LA1" is presented to the host device 102 as storing the new data. Thus, while from the host device's standpoint the command to write the new data to the specified logical memory address "LA1" is successfully performed; from the storage device's standpoint the new data actually resides in redirected logical memory address "RLA4".

Associating logical memory address "LA1" with redirected logical memory address "RLA4" breaks the association previously created between logical memory address "LA1" and redirected logical memory address "RLA1".

Figure 3:
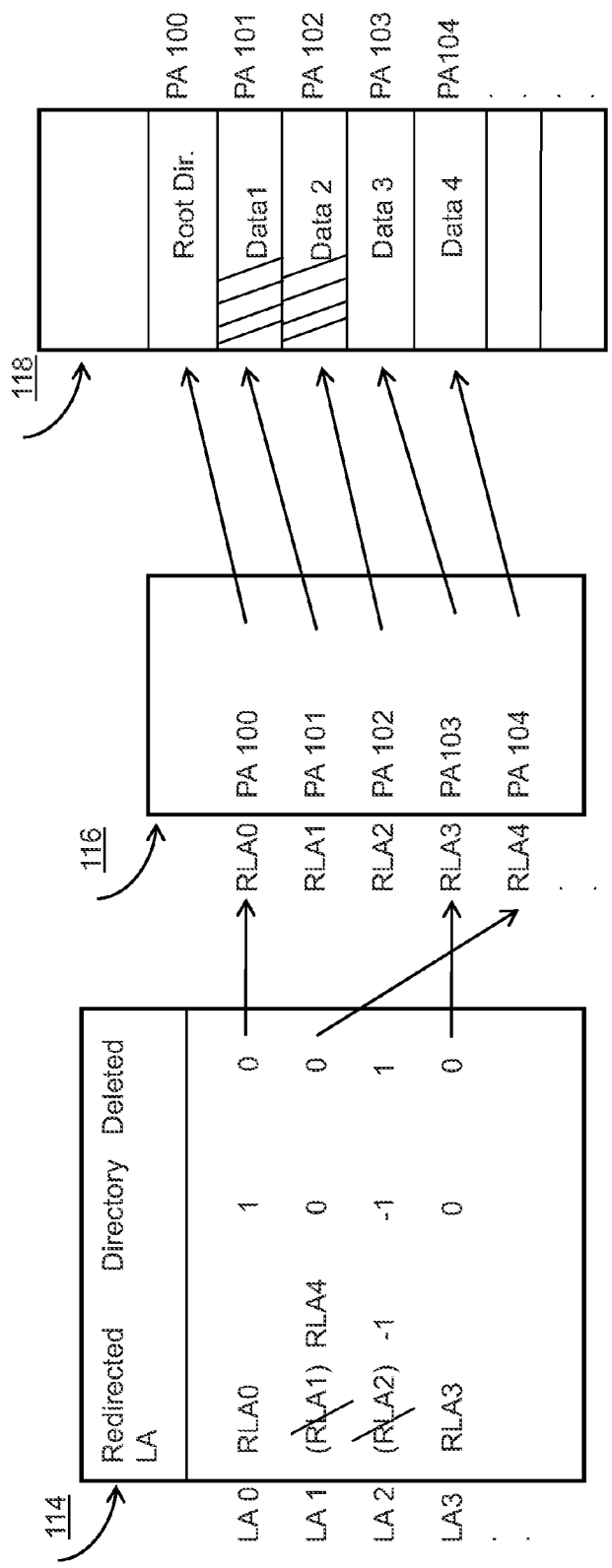
FIG. 3 illustrates a memory address mapping scheme implemented in the storage device.

FIG. 3 illustrates a memory address mapping scheme implemented in the storage device. FIG. 3 will be described in association with FIG. 2B, showing example association between logical memory addresses and physical memory addresses. Connecting arrowed lines illustrate a possible mapping of logical to physical memory addresses. Partial horizontal lines in entries represented by physical memory addresses "PA101" and "PA102" demonstrate memory locations that store data that are not available to the host device 102.

In a similar manner to FIG. 2B, database 114 holds entries that are referenced, for example, by logical memory address "LA0", logical memory address "LA1", logical memory address "LA2", logical memory address "LA3", and so on. Each entry in database 114 contains information for converting its logical memory address (referred to herein as the specified logical memory address) to a redirected logical memory address. That is, specified logical memory address "LA0" is associated a redirected logical memory "RLA0", specified logical memory address "LA1" is associated a redirected logical memory address "RLA1", specified logical memory address "LA2" is associated a redirected logical memory "RLA2", specified logical memory address "LA3" is associated a redirected logical memory "RLA3", and so on. Thus, for example, from the standpoint of the host device 102, "Data4" is stored in the memory 110 in specified logical memory address "LA1". However, from the stand point of the storage device 104, "Data4" is actually associated with redirected logical memory address "RLA4".

Mapping table 116 holds physical memory address associations in logical memory address entries. Each entry in mapping table 116 includes an association between a logical memory address (in this case a redirected logical memory address) and a physical memory address where data physically resides. For example, redirected logical memory address "RLA0" references physical memory address "PA100"; redirected logical memory address "RLA1" references physical memory address "PA101"; redirected logical memory address "RLA2" references physical memory address "PA102"; redirected logical memory address "RLA3" references physical memory address "PA103"; redirected logical memory address "RLA4" references physical memory address "PA104", and so on.

As mentioned above, data is stored in the memory 110 (in storage area 118) in physical memory addresses. The entries referenced by physical memory addresses "PA100", "PA101", "PA102", "PA103", and "PA104" demonstrate this. As shown, the data associated with redirected logical memory address "RLA0" (the "Root Directory" in this case) resides in physical memory address "PA100"; the data ("Data1") associated with redirected logical memory address "RLA1" resides in physical memory address "PA101"; the data ("Data2") associated with redirected logical memory address "RLA2" resides in physical memory address "PA102"; the data ("Data3") associated with redirected logical memory address "RLA3" resides in physical memory address "PA103"; the data ("Data4") associated with redirected logical memory address "RLA4" resides in physical memory address "PA104", and so on.

As mentioned above, associating logical memory addresses (specified logical memory addresses) with new redirected logical memory address breaks the association previously created (in mapping table 116) between the specified logical memory addresses and redirected logical memory addresses. However, a change in association of logical memory addresses as such does not break any association previously created between the redirected logical memory addresses and corresponding physical logical memory addresses. In other words, the physical memory address associations in logical memory address entries as provided by mapping table 116 remain the same.

Figure 4:
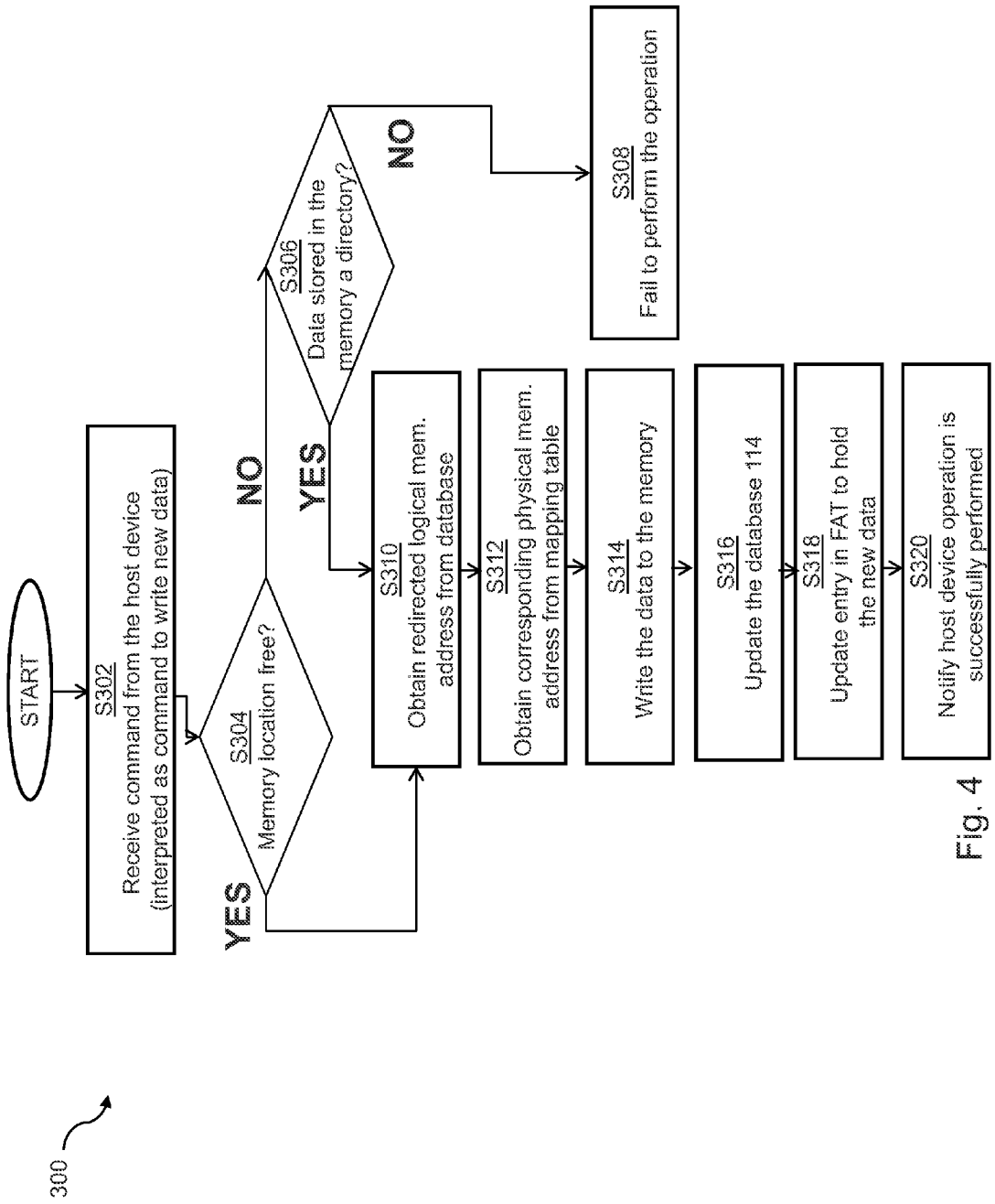
FIG. 4 is a flow diagram of a method for handling commands within the storage device according to one embodiment.

FIG. 4 is a flow diagram illustrating a method 300 of handling commands within the storage device according to one embodiment. FIG. 4 will be described in conjunction with FIG. 1. Method 300 is performed by controller 108 within storage device 104, where it executes commands that are received from the host device 102 in a way that is transparent to the host device 102. A particular implementation of method 300 includes controller 108, upon receiving a write command specifying a logical memory location from the host device 102, interprets the command as a command to write new data to the specified logical memory address in the memory 110. Controller 108 may be designed to interpret the command as such based on information that is stored in the FAT 119 in the directory entry that is referenced by the redirected logical memory address of the specified logical memory address. More specifically, controller 108 may be designed to access the directory entry in FAT 119 that is referenced by the redirected logical memory in order to compare between the data already stored in this entry and the data that is received from the host device 102. When the data received from the host device includes more information, i.e. in addition to the data already stored in the memory, this means that the host device 102 is requesting to write new data. According to another scenario, controller 108 may interpret the command to be a command to write new data to the memory 110 when the associated entry in the database 114 is free, or marked as deleted.

At step S302, controller 108 receives a command from host device 102, via host interface 106, to write new data to a specified logical memory address in the memory 110. At step S304, controller 108 determines whether the memory location associated with the specified logical memory address is free. Controller 108 may do this based on information extracted from the entry in the database 114 that is referenced by the specified logical memory address. Thus, for example, the value '−1' in the Directory field may indicate to the controller 108 that the memory location is free. If the memory location is occupied (shown as "NO" at S304), then controller 108 determines, at step S306, whether the data already stored in the memory 110 in association with the specified logical memory address is a directory cluster. As described above, the value '0' in the Directory field may indicate to the controller 108 that the memory location is occupied by a file cluster. Accordingly, the value '1' may indicate to the controller 108 that the data already stored there is a directory cluster. In the negative case (shown as "NO" at S306), i.e. with the data already stored in this memory location is a file cluster, then controller 108 fails to perform the command and notifies the host device 102 accordingly (at S308). For example, in such case controller 108 may notify the host device 102 that the writing of new data is not allowed. This may be applicable in an implementation where the controller 108 is configured to allow multiple write operations to a directory cluster but to allow only a single write operation to a file cluster. However, if the memory location associated with the specified logical memory address is a directory cluster (shown as "YES" at S306), then controller 108 proceeds to step S310.

At step S310, controller 108 accesses database 114 to obtain the redirected logical memory address where data associated with the specified logical memory address actually resides. Again, controller 108 may obtain the redirected logical memory address from the specified logical memory address entry in the database 114. If a redirected logical memory address is not yet stored in the database 114 in association with this entry, then controller 108 creates such association by accessing its directory entry in the FAT 119 in search for an available memory location (i.e. cluster). The logical memory address that is associated with the available memory location, typically the next available memory location, is then stored in the entry in the database 114 as the redirected logical memory address.

Controller 108 uses the redirected logical memory address in connection with mapping table 116 to identify the physical memory location where the data is to be actually written. To do this controller 108 accesses mapping table 116 and obtains (at S312) the physical memory address that corresponds to the redirected logical memory address. At step S314, controller 108 writes the data to this physical memory address in storage area 108.

Next, at step S316 controller 108 updates the entry in the database 114 that is referenced by the specified logical memory address. Step S316 is carried out by the controller 108 for updating the database 114 with information that relate to the way the data is actually written to in the memory 110. It should be noted, that updating database 114 may require or involve additional pre-processing steps. For example, if the data is being written to a memory location storing a directory cluster, then controller 108 creates a new entry, such that information that relate to the way the new data is stored in the memory 110 is kept in the new entry. The new entry is typically created in association with the (original) entry that is referenced by the specified logical memory address. In such case, controller 108 may analyze the type of data being written, e.g. if it's a directory cluster (sub-directory in this case) or a file cluster, so that the updating of the database 114 is performed with respect to the analyzed data. That is, if the data to be written is a file cluster, then controller 108 updates the value of the Directory field of the new entry in the database 114 to hold the value '0'. This indicates to the controller 108 that the memory location associated with this entry is occupied with a file cluster. On the other hand, if the type of data being written is a directory cluster (sub-directory in this case) then the Directory field of the new entry in the database 114 is updated to hold the value '1'.

At step S318, controller 108 updates the corresponding entry in the FAT 119 by adding to it the new (recently written) data. At step S320, controller 108 notifies to the host device 102 of the completion of the write command, for example by negating its BUSY signal or setting its READY signal.

Returning to step S304, with the specified logical memory location referencing a free memory location (shown as "YES" at S304), controller 108 jumps to step S310, where it performs steps S310 through S320 in a similar manner to that described above.

Figure 5:
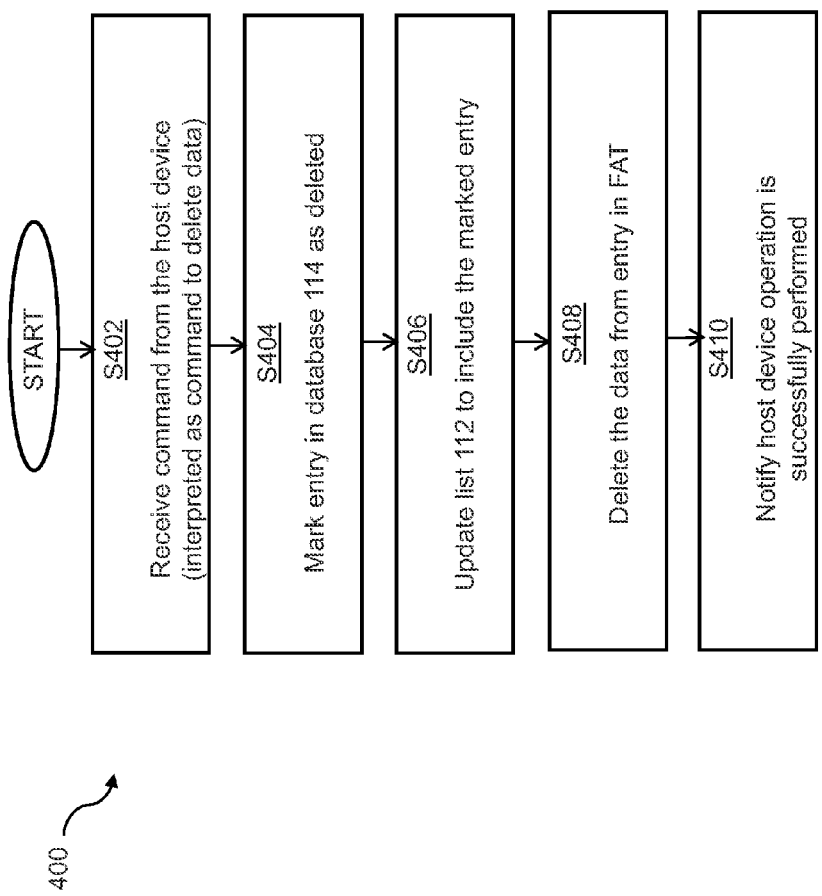
FIG. 5 is a flow diagram of a method for handling commands within the storage device according to another embodiment.

FIG. 5 is a flow diagram illustrating a method 400 of handling commands within the storage device according to another embodiment. FIG. 4 will be described in conjunction with FIG. 1. A particular implementation of method 400 includes controller 108, upon receiving a command from the host device 102 to write data to a specified logical memory address, interprets the command as a command to delete data from the specified logical memory address in the memory 110. As mentioned above, controller 108 may do this based on information that is stored in the corresponding directory entry in FAT 119. When the data residing in this directory entry in FAT 119 includes more information, i.e. in addition to the data that is received from the host device 102, or alternatively—if the data received from the host device 102 includes a predefined pattern, this means that the host device 102 is requesting to delete data from the memory 110.

At step S402, controller 108 receives a command from host device 102 that is interpreted by the controller 108 as a command to delete data from a specified logical memory address in the memory 110. At step S404, controller 108 accesses the database 114 and marks the entry referenced by the specified logical memory address as deleted. As mentioned above, controller 108 may do this by accessing the Deleted field and marking its value '1'. This indicates to the host device 102 that the memory location associated with the specified logical memory address is now free.

Next, at step S406, controller 108 adds the marked entry to list 112, updating it accordingly. Controller 108 updates list 112 by creating, or adding to it a new entry. The new entry in the list 112 is referenced by the redirected logical memory address that corresponds to the specified logical memory address. As mentioned above, updating list 112 with the marked entry as such is provided to enable restoration of the data from its memory location, thereby making the data associated with the marked entry accessible to the host device 102 at a later point in time.

Following this, at step S410, controller 108 deletes the data from its entry in FAT. And at step S412, controller 108 notifies the host device 102 that the operation is successfully performed, for example by negating its BUSY signal or setting its READY signal.

The processes proposed in methods 300 and 400 provide for, in a storage device having a write-once, read-many configuration, to handle commands received from a host device in a way that is transparent to the host device by interpreting the commands based on internal information stored on the storage device and executing the commands accordingly. Advantageously, executing host commands within the storage device as such enables to operate the storage device as a WORM device with any host device, and further insures that the once data is written to the storage device it could never be deleted again by any host device.

In sum, the foregoing described a storage device having a write-once read many device configuration and comprising a controller, a memory, and a host interface. The memory stores a database having logical memory address entries. Each entry in the database contains information for converting its respective logical memory address to a redirected logical memory address, where data associated with the logical memory address actually resides. The controller is configured to, when the host interface is operatively coupled to a host device, receive a command specifying a logical memory address and then interpret and execute the command based on and according to information extracted from the database, transparently to the host device. The information is typically extracted from an entry in the database that corresponds to the specified logical memory address, and includes a redirected logical memory address that corresponds to the specified logical memory address.

The disclosure also contemplates a method of handling commands in a storage device a write-once, read-many device configuration and coupled to a host device. The controller, in a storage device having a memory, a controller and a host interface, receives a command via the host interface, interprets the command based on information extracted from the database, and executes the command according to the information, transparently to the host device. Again, the command specifies a logical memory address, such that the information is extracted from an entry in the database that corresponds to the specified logical memory address.

Although the foregoing embodiments have been described in considerable detail with reference to certain preferred versions thereof, other embodiments and versions are possible. Such, for example, although the embodiments have been described primarily with regard to logical memory address entries representing clusters in a file allocation table (FAT) memory arrangement, it will be understood that the storage device could be adapted to operate in other data structures and other file system configurations. Further, the functionality of the various features of the described embodiments may be distributed differently. Therefore, the spirit and scope of the appended claims should not be limited to the description of the preferred embodiments and versions contained herein.

It will be apparent to one of ordinary skilled in the art that the embodiments as described above may be implemented in many different forms of software, firmware, and hardware in the implementations illustrated in the figures. The actual software code or specialized control hardware used to implement aspects consistent with the foregoing detailed description is not limiting of the foregoing detailed description. Thus, the operation and behavior of the embodiments were described without specific reference to the specific software code, it being understood that a person of ordinary skill in the art would be able to design software and control hardware to implement the embodiments of the description herein.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another.

What is claimed is:

1. A method comprising:
in a storage device having a memory, a controller, and a host interface, the storage device having a write-once read-many (WORM) device configuration and the memory containing a database having entries for converting logical memory addresses to redirected logical memory addresses that correspond to physical memory locations of the memory, performing by the controller:
receiving a command from a host device via the host interface, the command indicating a write operation and specifying a logical memory address of the logical memory addresses;
in response to receiving the command, accessing information stored at an entry in the database, wherein the entry corresponds to the specified logical memory address, the information indicating a redirected logical memory address of the redirected logical memory addresses, the redirected logical memory address corresponding to the specified logical memory address; and
executing the command according to the information, wherein executing the command includes updating the database to indicate to the host device that the specified logical memory address is free for a subsequent write operation by the host device.

2. The method of claim 1, wherein the entry in the database represents a cluster in a file allocation table.

3. The method of claim 1, wherein the information further includes at least one of an indication of a type of data stored at a physical memory location of the physical memory locations, and an indication of whether the entry is marked as deleted.

4. The method of claim 1, wherein the memory further contains a list of entries for logical memory addresses that are marked as deleted, each entry of the list containing information for restoring data.

5. The method of claim 4, further comprising:
receiving a second command from the host device, the second command indicating to delete data associated with a second specified memory address;
marking a second entry of the database as deleted, the second entry associated with the second specified memory address; and
updating the list to include the marked second entry.

6. The method of claim 1, wherein the redirected logical memory address is associated with a next available memory location in the memory.

7. A storage device having a write-once read-many (WORM) device configuration, the storage device comprising:
- a memory containing a database having entries, for converting logical memory addresses to redirected logical memory addresses that correspond to physical memory locations of the memory;
- a host interface operative to interface with a host device; and
- a controller configured to:
  - receive a command from the host device via the host interface, the command indicating a write operation and specifying a logical memory address of the logical memory addresses;
  - in response to receiving the command, access information stored at an entry in the database, the entry corresponding to the specified logical memory address, the information including a redirected logical memory address of the redirected logical memory addresses, the redirected logical memory address corresponding to the specified logical memory address; and
  - execute the command according to the information, wherein executing the command includes updating the database to indicate to the host device that the specified logical memory address is free for a subsequent write operation by the host device.

8. The storage device of claim 7, wherein the entry in the database represents a cluster in a file allocation table.

9. The storage device of claim 7, wherein the information further includes at least one of an indication of a type of data stored at a physical memory location of the physical memory locations and an indication of whether the entry is marked as deleted.

10. The storage device of claim 7, wherein the memory further contains a list of entries for logical memory addresses that are marked as deleted, each entry of the list containing information for restoring data.

11. The storage device of claim 10, wherein, the controller is further configured to:
- receive a second command from the host device, the second command indicating to delete data associated with a second specified memory address;
- mark a second entry of the database as deleted, the second entry that is associated with the second specified memory address; and
- update the list to include the marked second entry.

12. The storage device of claim 7, wherein the redirected logical memory address is associated with a next available memory location in the memory.

13. The storage device of claim 7, wherein the controller is further configured to handle the command indicating the write operation as a request to delete data without deleting data in response to receiving the command.

14. The storage device of claim 13, wherein the controller is further configured to notify the host device, after handling the command as the request to delete data, that the write operation has been performed successfully.

15. The storage device of claim 7, wherein the database further includes a plurality of fields corresponding to the entries, wherein each field indicates a respective one of a first value indicating that a respective one of the physical memory locations stores directory data, a second value indicating that a respective one of the physical memory locations stores file data, and a third value indicating that a respective one of the physical memory locations is free.

16. The storage device of claim 7, wherein the storage device is embedded within the host device.

* * * * *

UNITED STATES PATENT AND TRADEMARK OFFICE
CERTIFICATE OF CORRECTION

PATENT NO. : 8,595,426 B2
APPLICATION NO. : 13/084111
DATED : November 26, 2013
INVENTOR(S) : Eyal Ittah et al.

It is certified that error appears in the above-identified patent and that said Letters Patent is hereby corrected as shown below:

In the Claims

Column 16, Claim 3, Line 54, "tions, and an indication of whether the entry is marked as" should read --tions and an indication of whether the entry is marked as--.

Column 18, Claim 11, Line 11, "entry that is associated with the second specified" should read --entry associated with the second specified--.

Signed and Sealed this
Twelfth Day of August, 2014

Michelle K. Lee
*Deputy Director of the United States Patent and Trademark Office*